J. E. CHOSTNER.
SHOCK ABSORBER.
APPLICATION FILED JULY 24, 1915.
1,172,672.
Patented Feb. 22, 1916.
2 SHEETS—SHEET 1.
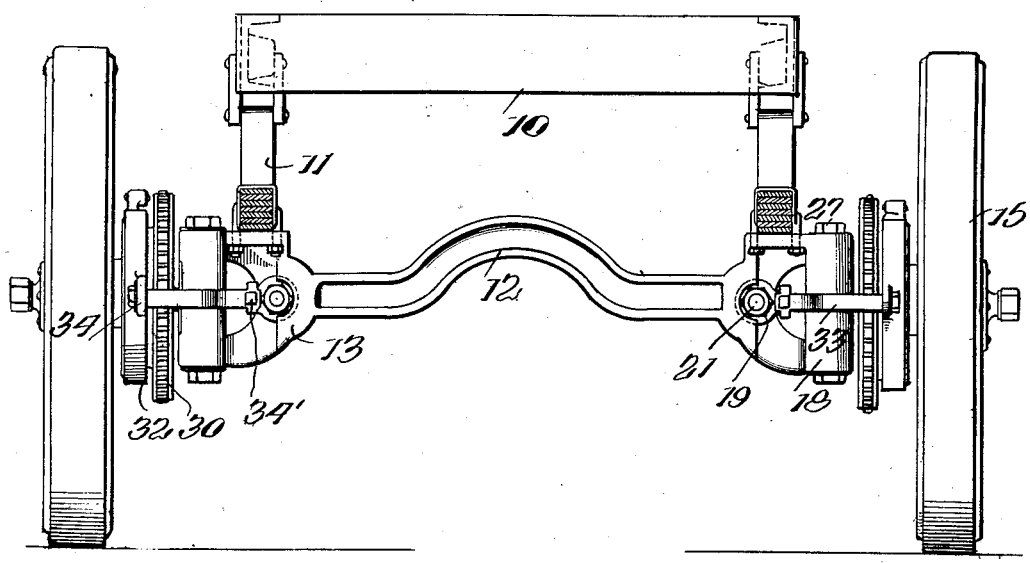
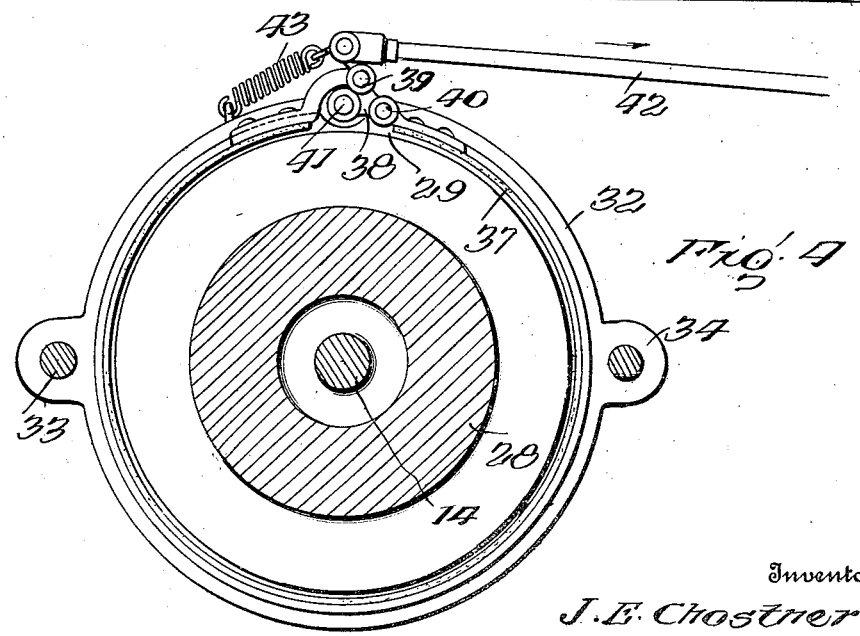
Inventor
J. E. Chostner
By
_____, Attorneys

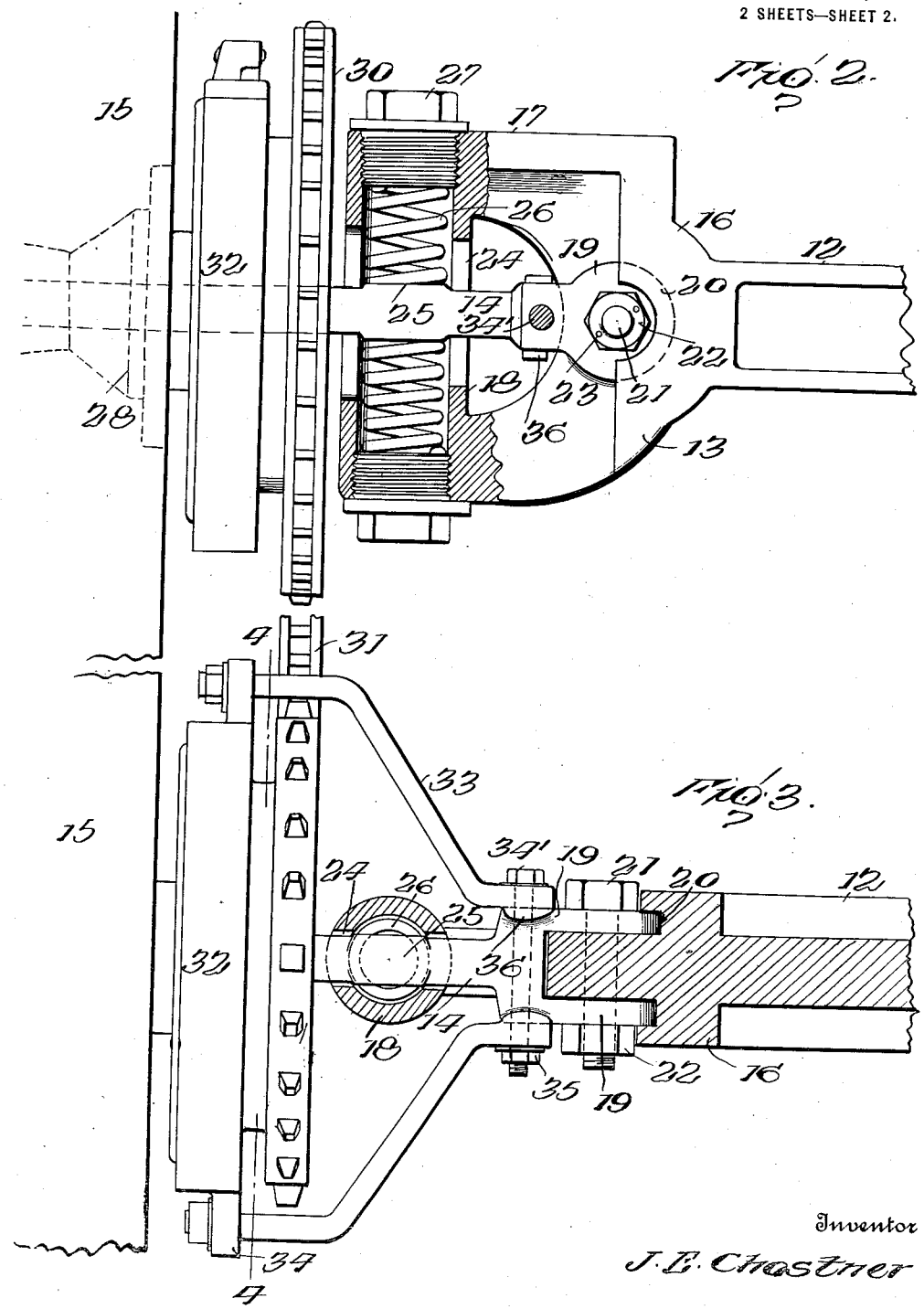

UNITED STATES PATENT OFFICE.

JAMES E. CHOSTNER, OF BENTON, MISSOURI.

SHOCK-ABSORBER.

1,172,672.  Specification of Letters Patent.  Patented Feb. 22, 1916.

Application filed July 24, 1915.  Serial No. 41,708.

*To all whom it may concern:*

Be it known that I, JAMES E. CHOSTNER, a citizen of the United States, residing at Benton, in the county of Scott and State of Missouri, have invented certain new and useful Improvements in Shock-Absorbers, of which the following is a specification.

My invention relates to new and useful improvements in vehicle axles and more particularly in vehicle axles of the dead axle type, the primary object of my invention being the provision of an axle of the above described character which will embody shock absorber mechanisms between the axle proper and the wheel carrying spindle portions thereof.

More particularly, my invention relates to the provision of a rear axle terminating at its ends in spindle receiving yokes, the yokes each including suitable housings for cushioning springs which normally hold the spindles in axial alinement with the axle and the axle being adapted to receive wheels, the hubs of which carry the usual sprockets for a chain drive and the customary brake drum.

In this connection, a still further object of my invention consists in so constructing the yokes and spindles as to provide a firm and enlarged bearing between the two in order to, as much as possible, relieve the pivot bolts connecting the spindles to the axle from unnecessary strain.

A still further object of my invention is to provide means for supporting the brake drum housing upon the spindle in order that it may move in unison with the movement of the wheel and thus prevent undesired application of the brakes when the wheel passes over inequalities in the road.

With these and other objects in view, my invention will be more fully described, illustrated in the accompanying drawings, and then more specifically pointed out in the claims which are attached to and form a part of this application.

In the drawings: Figure 1 is a fragmentary vertical sectional view through the frame of a conventional motor vehicle, showing my rear axle applied thereto, the axle being shown in rear elevation; Fig. 2 is a fragmentary rear elevational view of one end of the rear axle, a portion of the yoke being shown in section; Fig. 3 is a transverse sectional view taken along the axis of the axle and spindle; Fig. 4 is a vertical sectional view taken along the line 4—4 of Fig. 3, looking in the direction of the brake drum.

Corresponding and like parts are referred to in the following description and indicated in all the views of the drawings by the same reference characters.

In order to clearly illustrate my invention, I have shown a motor vehicle construction including the bolster 10 connected by the usual springs 11 to a rear axle 12 which, with the exception of its ends, may be of any desired dead axle type. This rear axle 12 terminates at its ends in yokes, indicated as a whole by the numeral 13, to which are pivotally connected spindles 14 which carry the rear drive wheels 15, cushioning means, which will be later explained, being interposed between the yokes and spindles.

Referring more specifically to Figs. 2 and 3 of the drawings, for the details of construction, it will be apparent that each yoke 13 includes a body 16 extending at right angles to the axle 12 and provided at its upper and lower ends with outwardly directed arms 17, the free ends of which are connected by a tubular housing 18, the ends being enlarged and bored to form a continuation of the housing. Preferably, the body portion of the yoke is reduced somewhat in thickness in order that it may be straddled by the bifurcated or forked terminal 19 of the spindle 14. The arms of the forked terminal 19 are substantially circular in shape and the unreduced body portion 16 of the yoke is formed at either side with undercut sockets 20 which are semi-circular in shape to receive the free ends of the circular arms 19. The spindle is secured in place by a pivot bolt 21 passed through the center of the arms 19 and through the body portion 16 of the yoke and secured in place by a nut 22, the outer walls of the sockets 20 being cut-away somewhat to permit application of the bolt and nut and the nut being preferably provided in its outer face with sockets 23 to receive the prongs of a spanner wrench. As will be apparent, this manner of pivotally connecting the spindles to the yokes provides a half bearing for each of the forked arms of the spindle, which bearing will take up thrust exerted toward the center of the axle and to a great extent any upward and downward thrust exerted upon the spindle by the yoke and thus relieve the pivot bolts 21 of the greater part of the strain which they would otherwise have to support.

The spindles 14 project through vertically formed slots 24 in the tubular members 18 and the upper and lower faces of the spindles, within these tubular members, are preferably flattened somewhat, as shown at 25, to form seats for the inner ends of helical springs 26 which are positioned one above and one below each spindle and which are tensioned by tensioning plugs 27 threaded into the bores formed in the free ends of the arms 17 of the yokes. It will, of course, be understood that these springs are so proportioned and tensioned that, under normally loaded condition of the vehicle, the spindles 14 will extend in axial alinement with the axle 12 of the vehicle. In other words, the upper springs are considerably stronger than the lower springs.

Those ends of the spindles projecting beyond the yokes, are constructed to receive the hubs 28 of the drive wheels 15, which hubs are of the usual or any preferred type, the wheels of course being adapted to turn freely upon the spindles and at the same time being locked against longitudinal movement upon the spindles. Each wheel hub includes the usual brake drum 29 and each wheel hub also carries a sprocket wheel 30 about which a drive chain 31 may be trained. The usual brake drum housing 32 surrounds the brake drum, being supported in spaced relation thereto by bracket arms 33 which are connected at one end to ears 34 formed upon the peripheral outer face of the housings and the inner ends of which are clamped against opposite sides of the head portions of the spindles by bolts 34' and nuts 35. It should be noted at this point that the inner ends of the bracket arms 33 are enlarged and provided with flanges 36 which seat above and below the head portions of the spindles in such a manner that any vertical movement of the bracket arms 33, with respect to the spindles, is prevented. Because of this, it will be clear that the brake drum housing will, at all times, be held in proper spaced relation about the brake drum in as much as its supporting arms 33 move in unison with the spindle 14 carrying the wheel which, in turn, carries the brake drum.

Mounted about the brake drum and within the housing is the usual brake band 37 pivotally connected at its ends to the free ends of the arms of a bell crank lever 38, as shown at 39 and 40, this lever being pivoted to the brake drum housing, as shown at 41. A brake rod 42 is operatively connected to the pivot pin 39 of the bell crank lever 38 in such a manner that movement of the rod in the direction of the arrow in Fig. 4, will cause tightening of the brake band about the drum and consequent application of the brakes. A helical spring 43, connected at one end to the brake rod 42 and at its other end to the brake drum housing, normally holds the brake rod in retracted position and, consequently, keeps the brake band out of engagement with the drum.

The operation of the above described shock absorbing axle will be readily appreciated from an inspection of the drawings. It will be clear that the pivotal connection between the axle yokes and spindles is such as to hold the spindle against any movement other than in a vertical plane and that this permitted movement in a vertical plane is cushioned and limited by the helical springs 26, the tension of which may be adjusted. It will therefore be clear that the spindles and wheels may have slight vertical movement independent of the vehicle axle upon impact of the wheels against irregularities in the road and that this independent movement will not transmit any perceptible shock or jar to the rear axle because of the cushioning springs 26.

Although I have illustrated and described my invention in all its details of construction, it will of course be understood that I do not wish to be limited to such details as various minor changes, within the scope of the appended claims, may be made at any time, without in the slightest degree departing from the spirit of my invention.

Having thus described the invention, what is claimed as new is:

1. A shock absorbing axle for vehicles including an axle proper terminating at its ends in yokes having vertically spaced arms, tubular housings connecting the free ends of the arms, spindles pivoted to the yokes and extending through slots formed in the housings, and springs inclosed in the housings and engaging against the upper and lower faces of the spindles.

2. A shock absorbing axle for vehicles including an axle proper terminating at its ends in yokes having vertically spaced arms, tubular housings connecting the free ends of the arms, spindles pivoted to the yokes and extending through slots formed in the housings, and springs inclosed in the housings and engaging against the upper and lower faces of the spindles, the yokes being formed with semi-circular recesses providing bearings and the spindles with substantially circular shaped terminals engaged in the bearings.

3. A shock absorbing axle including an axle proper terminating at its ends in yokes having vertically spaced arms and tubular housings connecting the free ends of the arms, the arms being formed with openings alining with the housings and the yokes have semi-circular recesses, spindles formed at one end with forked heads to straddle the yokes and seat in the recesses, those portions of the heads seating in the recesses being substantially circular in shape, pivotal connections between the forked heads of the spindles and the yokes, the spindles extending through slots formed in the housings, springs seated in the housings and engaging against the upper and lower faces of the spindles, and plugs closing the upper and lower ends of the housings and tensioning the springs.

4. A shock absorbing axle including an axle proper terminating at its ends in yokes having vertically spaced arms and tubular housings connecting the free ends of the arms, the arms being formed with openings alining with the housings and the yokes have semi-circular recesses, spindles formed at one end with forked heads to straddle the yokes and seat in the recesses, those portions of the heads seating in the recesses being substantially circular in shape, pivotal connections between the forked heads of the spindles and the yokes, the spindles extending through slots formed in the housings, springs seated in the housings and engaging against the upper and lower faces of the spindles, plugs closing the upper and lower ends of the housings and tensioning the springs, arms secured to the spindles, and brake drum housings carried by the free ends of the arms to move with the spindles.

5. A shock absorbing axle including an axle proper, spindle members pivotally connected to the free ends of the axle, cushioning means between the axle and spindle members normally holding the latter in alinement with the axle, arms secured to opposite sides of the spindle members to swing therewith and extending toward the free ends of the spindle members, and brake drum housings carried by the free ends of the arms.

6. A shock absorbing axle for vehicles including an axle terminating at its ends in yokes having vertically spaced arms, spindles having bifurcated ends to straddle the intermediate portions of the yokes to which they are pivoted, and springs positioned between the arms of the yokes and opposite faces of the spindles to cushion the latter.

7. A shock absorbing axle including an axle proper, spindles pivotally connected to the free ends of the axle, means yieldably limiting the swinging of the spindles, and brake drum supporting means carried by the spindles to swing therewith.

In testimony whereof I affix my signature.

JAMES E. CHOSTNER. [L. S.]